United States Patent
Sato

[15] 3,694,898
[45] Oct. 3, 1972

[54] METHOD OF FORMING CARRIER MEANS FOR CARRYING AND COOLING SEMI-CONDUCTOR RECTIFIER ELEMENTS FOR AN ALTERNATING CURRENT LIGHTING GENERATOR FOR MOTOR VEHICLES

[72] Inventor: Suguru Sato, Motogariya Shataku, Japan

[73] Assignee: Nippon Denso Kabushiki Kaisha, Bachi, Japan

[22] Filed: Sept. 24, 1970

[21] Appl. No.: 74,999

Related U.S. Application Data

[62] Division of Ser. No. 811,323, March 28, 1969, Pat. No. 3,553,505.

[52] U.S. Cl..................................29/477, 29/475
[51] Int. Cl. .............................................B23k 31/02
[58] Field of Search.....29/475, 477, 480, 481, 471.1, 29/482; 113/116 D, 116 G, 116 HA

[56] References Cited

UNITED STATES PATENTS

| | | | |
|---|---|---|---|
| 680,595 | 8/1901 | Inshaw | 29/477 |
| 3,302,281 | 2/1967 | Freeman et al. | 29/477 X |
| 3,423,819 | 1/1969 | Carlson et al. | 29/477 X |

Primary Examiner—John F. Campbell
Assistant Examiner—Richard Bernard Lazarus
Attorney—Michael S. Striker

[57] ABSTRACT

A method of forming carrier means for carrying and cooling semi-conductor rectifier elements for an alternating current lighting generator for motor vehicles in which a narrow straight strip of sheet metal is first formed with a plurality of cutouts which extend uniformly spaced from each other and transverse to the longitudinal direction of the strip from one toward but short of the other edge of the strip, to thus provide a plurality of strip sections connected to each other at the other edge. Opposite edge portions of the strip are then bent to one side and substantially normal to the plane of the remainder of the strip and the strip sections are then bent in the aforementioned plane about an axis normal thereto a polygonal configuration.

4 Claims, 6 Drawing Figures

INVENTOR
Suguru SATO his ATTORNEY

INVENTOR
Suguru SATO his ATTORNEY

METHOD OF FORMING CARRIER MEANS FOR CARRYING AND COOLING SEMI-CONDUCTOR RECTIFIER ELEMENTS FOR AN ALTERNATING CURRENT LIGHTING GENERATOR FOR MOTOR VEHICLES

CROSS REFERENCE TO RELATED APPLICATIONS

The present application is a Divisional Application of the application filed Mar. 28, 1969 under the Ser. No. 811,323 now U.S. Pat. No. 3,553,505, for "Rectifier Device For Alternating Current Lighting Generator For Motor Vehicles."

BACKGROUND OF THE INVENTION

The present invention relates to rectifier devices for alternating current lighting generators for motor vehicles, and more specifically to a method for forming carrier means for carrying and cooling semi-conductor rectifier elements of such rectifier devices.

Devices of this type are known in the art in which semi-conductor rectifier elements, for instance silicone diodes, are carried on arc-shaped sheet metal strips provided at the inner and outer edges thereof with flanges extending normal to the plane of the remainder of the strip. The curved configuration of the sheet metal strip is necessary in order to arrange the carrier strip sheet in the interior of a bearing shield of the generator about the shaft of the latter, and the flanges provided on the sheet metal strip will increase the surface thereof to thus improve its heat transmission without increasing essentially the space requirements for the carrier, and in addition these flanges will properly stiffen the curved sheet metal strips.

These known carriers are punched out in the curved form from large sheet metal pieces or sufficiently wide sheet metal strips and the flanges thereon are subsequently formed by a drawing operation. This manner of producing the carrier will result in a relatively great amount of scrap which will considerably increase the cost of its production, especially when the large sheet metal plates or the wide sheet metal strips from which the curved carriers are formed are more expensive than for instance narrow sheet metal strips. In addition, the rigidity and the heat dissipating surface of these carriers thus obtained are often insufficient.

SUMMARY OF THE INVENTION

It is an object of the present invention to provide for a method of forming carrier means for carrying and cooling semi-conductor rectifier elements for rectifier devices of the aforementioned kind and according to which these carrier means may be produced in a very simple manner with a minimum of scrap, and in which the carrier means thus produced will have a rigidity and cooling surface to satisfy the increased demands made on such carriers in this respect.

With these objects in view, the method according to the present invention of forming carrier means for carrying and cooling semi-conductor rectifier elements for an alternating current lighting generator for motor vehicles mainly comprises the steps of forming in a narrow straight sheet metal strip a plurality of cutouts which extend uniformly spaced from each other and transverse to the longitudinal direction of the strip from one toward but short of the other edge thereof, to thus form a plurality of strip sections connected to each other at the other edge, bending opposite edge portions of the strip to one side and substantially normal to the plane of the remainder of the strip, and bending the aforementioned sections in the plane about an axis normal thereto to a polygonal configuration.

The novel features which are considered as characteristic for the invention are set forth in particular in the appended claims. The invention itself, however, both as to its constructions and its method of operation, together with additional objects and advantages thereof, will be best understood from the following description of specific embodiments when read in connection with the accompanying drawing.

DESCRIPTION OF THE PREFERRED EMBODIMENTS

Figure 1:
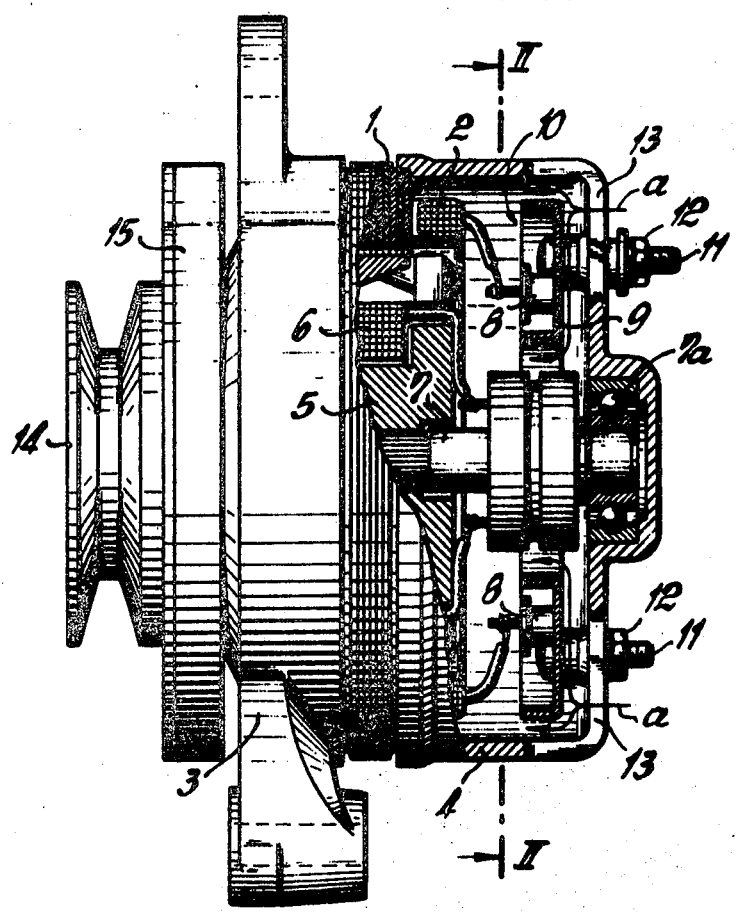
FIG. 1 is a partially sectioned side view of a lighting generator according to the prior art.
Figure 2:
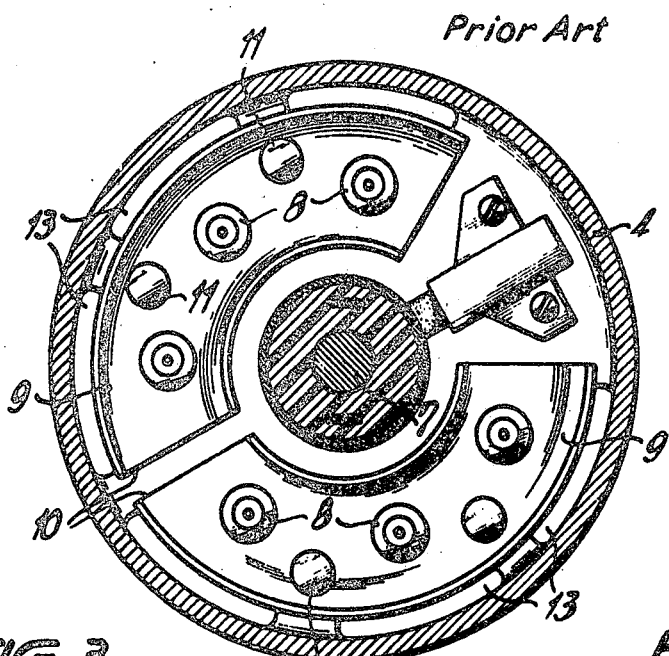
FIG. 2 is a cross-section taken along the line II—II of FIG. 1.
Figure 3:
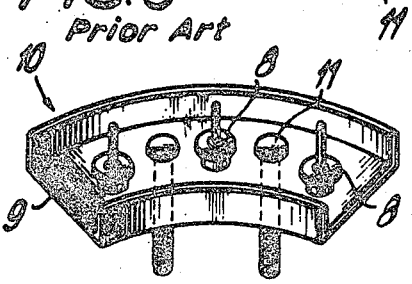
FIG. 3 is a perspective view of carrier means according to the prior art with rectifier elements arranged thereon.

FIGS. 1 and 2 illustrate an alternating current lighting generator according to the prior art which comprises a plurality of superimposed stator laminations 1 carrying the stator winding 2 and being clamped between the bearing shield 3 located at the driven end of the generator, and the bearing shield 4 located at the side of the generator at which the slip rings are provided, by screws, not shown in the drawing. A rotor 5, the poles of which carry a winding 6, is arranged coaxially in the interior of the stator 1, separated therefrom by an annular air gap, and the rotor 5 is mounted with a press-fit on a shaft 7 for rotation therewith. The shaft 7 is by means of ball bearings 7a, only one of which is shown in FIG. 1, journalled in the bearing shields 3 and 4. The shaft 7 projects through a bore in the bearing shield 3 outwardly of the latter and carries at its outer portion a drive pulley 14 and a ventilating fan 15. The fan 15 sucks heated air through openings in the bearing shield 3 from the interior of the generator and, due to the thus-produced underpressure in the interior of the generator, cool air from the surrounding atmosphere will flow in the direction as indicated by the arrows *a* through opening 13 in the bearing shield 4 into the interior of the generator. A rectifier device 10 is arranged in the interior of the bearing shield 4 and in the path of the cool air streams. This rectifier device comprises carrier and cooling means in form of sheet metal members 9 to which silicone diodes 8 are connected by soldering, and which are connected in circuit with the stator winding 2. The cooling sheets 9 are connected to the bearing shield 4 by means of screws 11 and nuts 12. Each of the cooling sheets has a U-shaped cross-section and an arc-shaped configuration, as best shown in FIGS. 2 and 3, and the diodes 8 are arranged at the open side of the U facing away from the direction of the cool air streams.

Figure 4:
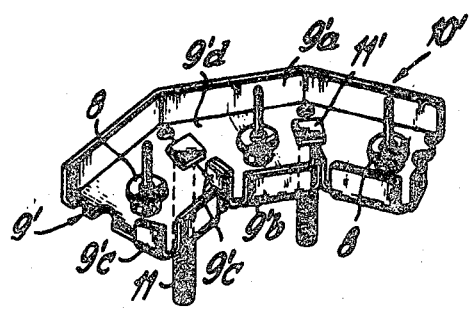
FIG. 4 is a perspective view of carrier means according to the present invention with rectifier elements arranged thereon.

A rectifier device 10' according to the present invention is illustrated in a perspective view in FIG. 4.

It is to be understood that a pair of such rectifier devices, as shown in FIG. 4, are arranged and connected to the bearing shield 4 of an alternating current lighting generator as described in connection with FIGS. 1 and 2.

Figure 5:
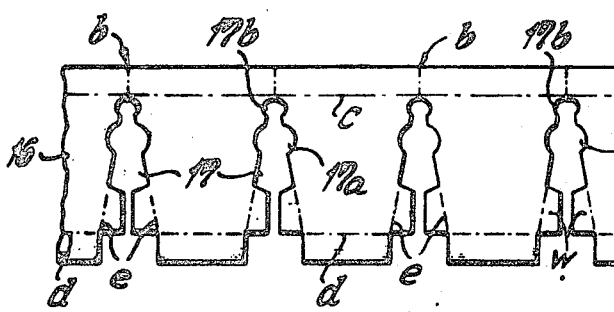
FIG. 5 is a plan view of a punched sheet metal strip from which the carrier means shown in FIG. 4 is to be formed.

Each of the rectifier devices 10' comprises a sheet metal member 9', the diodes 8 soldered thereto, and connecting means in form of screws 11'. The sheet metal member 9' is formed from a relatively narrow sheet metal strip 16, as shown in FIG. 5, into which substantially doll-shaped or wedge-shaped cutouts 17 are punched equally spaced from each other in the longitudinal direction of the strip and extending transverse to the longitudinal direction from one towards but short of the other edge of the strip.

In order to form the sheet metal strip 16 into the configuration as shown in FIG. 4, a plurality of short cuts respectively arranged in the plane of symmetry of each cutout 17 are made, extending from the other edge of the strip towards but short of the respective cutout, as indicated by the dash-dotted line b, and then, opposite edge portions of the strip are bent normal to the plane of the strip along bend lines indicated by the dash-dotted lines c and d which are equally spaced from and parallel to the longitudinal edges of the strip, to form upwardly extending flanges 9'a and 9'b shown in FIG. 4, so that the strip will have a U-shaped cross-section. Each of the cutouts 17 is formed in such a manner as to provide in the region of the flanges 9'b a pair of wings w, and these wings are bent along the bend lines e substantially normal to the base of the U-shaped strip to the form 9'c as shown in FIG. 4. Subsequently thereto, the thus-formed U-shaped strip with the wings thereon is bent about an axis normal to the base of the U-shaped strip into a configuration of a fan-like polygonal strip as shown in FIG. 4. The sections of the polygonal strip are formed by trapezoidal base portions 9'd and the flange portions 9'a and 9'd, as well as the wing portions 9'c extending normal to the base portions and thereby increasing the rigidity of the strip as well as its heat dissipating surface. The cutouts 17 and the bend lines e of the wing portions are arranged in such a manner that, during bending of the strip 16 to the polygonal configuration as shown in FIG. 4, opposite edges of each cutout and the upwardly bent wing portions will abut against each other to leave only substantially circular openings 17a which serve to receive holding screws 11' and small circular openings 17b serving to reduce the tension in the sheet metal strip occurring during bending of the same into the polygonal configuration. The upwardly bent wing portions 9'c which abut against each other are connected to each other, preferably by welding, to thus maintain the cooling sheet 9' in its polygonal configuration.

Figure 6:
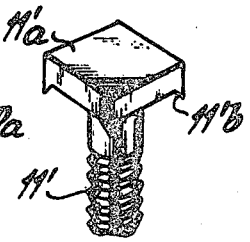
FIG. 6 is a perspective view, drawn on an enlarged scale, of connecting means, shown also in FIG. 4, for connecting the carrier means according to the present invention to a bearing shield of a generator.

Each of the fastening screws 11' has, as shown in FIG. 6, a cylindrical stem provided with a screw thread and a preferably rectangular head 11'a provided at each of its corners with a projection 11'b extending in the direction of the stem. The fastening screws 11' are inserted through the round openings 17a, whereby the projections 11'b abut in pairs on adjacent trapezoidal base portions 9'd of the strip. The projections are preferably welded to the base portions whereby the stiffness of the carrier strip is further increased.

The diodes 8 are connected in a known manner to the trapezoidal base portions 9'd of the sections of the carrier strip.

The carrier means or carrying and cooling sheets of the rectifying device according to the present invention can be made from narrow metal sheet strips while providing a perfect rigidity and increased heat dissipating surfaces. Furthermore, the carrier means according to the present invention may be produced with a minimum of scrap so that they may be manufactured at considerably smaller cost than the above-described bow-shaped carrier strips according to the prior art. Since the portions of the original flat strip are bent only about straight bend lines, the carrier may be formed in a simple and efficient manner reducing thereby the number of rejects obtained during mass production thereof.

The carrier means or cooling sheets, respectively the rectifier devices according to the present invention, may therefore be produced at a smaller cost than the known bow-shaped carrier strips according to the prior art while the carrier means according to the present invention will provide for a greater rigidity and larger heat dissipating surfaces than the known bow-shaped carrier means.

It will be understood that each of the elements described above, or two or more together, may also find a useful application in other types of rectifier devices differing from the types described above.

While the invention has been illustrated and described as embodied in a rectifier device for an alternating current lighting generator for motor vehicles, it is not intended to be limited to the details shown, since various modifications and structural changes may be made without departing in any way from the spirit of the present invention.

Thus for instance the welding of the projections 11'd on the screw heads to the trapizoidal base portions of the carrier means may be omitted. The screw heads 11'a may also have a different configuration than shown in FIG. 6 and the cutouts 17 in the sheet metal strips 16 may also be formed with a configuration different from that shown in FIG. 5.

What is claimed as new and desired to be protected by Letters Patent is set forth in the appended claims.

What is claimed is:

1. A method of forming a channel-shaped carrier means having a base portion for carrying and cooling semiconductor rectifier elements for an alternating current lighting generator for motor vehicles, said method comprising the steps of forming in a narrow straight sheet metal strip a plurality of cutouts extending from one longitudinal edge of the strip uniformly spaced from each other and transverse to the longitudinal direction of the strip toward but short of the other longitudinal edge thereof to form a plurality of strip sections connected to each other by an uninterrupted strip portion along said other longitudinal edge; bending said uninterrupted strip portion to one side and substantially normal to the plane of the remainder of the strip which constitutes the base portion of said carrier means and bending portions of the strip of a width substantially equal to that of said uninterrupted strip portion and located between said cutouts along said one longitudinal edge of the strip in the same direction and substantially normal to the plane of the base portion; and bending said sections in said plane to a polygonal configuration so that said sections abut with transverse edge portions defining respectively said cutouts against each other.

2. A method as set forth in claim 1, and including the step of forming at each cutout a pair of wing portions integral with said base portion and bending said wing portions along bend lines out of and substantially normal to said plane, said bend lines being arranged in such a manner that during bending of said sections to said polygonal configuration, one wing portion of each pair abuts with a face thereof against the corresponding face of the other wing portion of the pair, and including the step of connecting the abutting faces of each pair of wing portions to each other.

3. A method as defined in claim 2, wherein said wing portions of each pair are connected to each other by welding.

4. A method as defined in claim 2, wherein each of said cutouts is formed to provide in the finished strip a substantially circular opening in said base portions inwardly of said wing portions.

* * * * *